(12) United States Patent
Chen et al.

(10) Patent No.: US 7,580,555 B2
(45) Date of Patent: Aug. 25, 2009

(54) USING STATISTICAL PROCESS CONTROL (SPC) TO DEMONSTRATE SOLUTION CONVERGENCE IN A TECHNICIAN GUIDED SEGMENTATION SYSTEM

(75) Inventors: David T. Chen, Wrentham, MA (US); M. Weston Chapman, Hanover, NH (US); Haoning Fu, West Lebanon, NH (US)

(73) Assignee: M2S, Inc., West Lebanon, NH (US)

( * ) Notice: Subject to any disclaimer, the term of this patent is extended or adjusted under 35 U.S.C. 154(b) by 0 days.

(21) Appl. No.: 12/074,546

(22) Filed: Mar. 4, 2008

(65) Prior Publication Data

US 2008/0260224 A1   Oct. 23, 2008

Related U.S. Application Data

(63) Continuation of application No. 10/892,754, filed on Jul. 15, 2004, now Pat. No. 7,340,081.
(60) Provisional application No. 60/487,884, filed on Jul. 15, 2003, provisional application No. 60/580,082, filed on Jun. 15, 2004.

(51) Int. Cl.
*G06K 9/00* (2006.01)
(52) U.S. Cl. .................................. 382/128; 382/173
(58) Field of Classification Search ................ 382/173, 382/128, 209, 300
See application file for complete search history.

(56) References Cited

U.S. PATENT DOCUMENTS

| | | | | |
|---|---|---|---|---|
| 4,600,919 A | * | 7/1986 | Stern | 345/473 |
| 4,940,412 A | * | 7/1990 | Blumenthal | 434/267 |
| 6,006,126 A | * | 12/1999 | Cosman | 600/426 |
| 6,205,235 B1 | * | 3/2001 | Roberts | 382/128 |
| 6,310,619 B1 | * | 10/2001 | Rice | 345/420 |

OTHER PUBLICATIONS

Kang, et al. (The Visible Man: Three-Dimensional Interactive Musculo-Skeletal Anatomic Atlas of the Lower Extremity), pp. 279-286, RSNA, 2000.*

Leventon "Project on Image Guided Surgery: a Collaboration Between the MIT AI Lab and Brigham and Women's Surgical Planning Laboratory", pp. 1-5, image guided surgery, 1999.*

(Continued)

Primary Examiner—Daniel G Mariam
(74) Attorney, Agent, or Firm—Pandiscio & Pandiscio

(57) ABSTRACT

A method and apparatus for generating a computer model from scan data from a patient, comprising:

(1) acquiring the scan data from the patient;
(2) selecting a plurality of key frames from the scan data;
(3) hand segmenting the selected key frames, whereby to identify specific anatomical structures;
(4) automatically generating segmented intervening frames for the regions between the key frames using an interpolation process;
(5) merging the automatically segmented intervening frames with the hand segmented key frames so as to generate a complete set of segmented frames;
(6) obtaining a first measurement of a selected feature of the complete set of segmented frames;
(7) hand segmenting at least one additional key frame and replacing a corresponding intervening frame with said one additional key frame within the complete set of segmented frames;
(8) re-interpolating the set of segmented frames based upon the updated set of key frames;
(9) obtaining a second measurement of the selected feature of the re-computed set of segmented frames;
(10) comparing said second measurement with said first measurement; and
(11) if the second measurement differs from the first measurement by a statistically significant amount, replacing the first measurement with the second measurement and repeating the process from Step 7.

5 Claims, 16 Drawing Sheets

OTHER PUBLICATIONS

Robb, et al "Efficient shape-based algorithms for modeling patient specific anatomy from 3D medical images: applications in virtual endoscopy and surgery", pp. 97-110, IEEE, 1997.*

Kikinis, et al "A digital brain atlas for surgical planning, model-driven segmentation, and teaching", pp. 232-241, IEEE, 1996.*

* cited by examiner

MMS Reconstruction of an actual abdominal aortic aneurysm. Regions where the blood is flowing are in red (dark gray in this black and white figure), regions of thrombus and plaque formation are in yellow (light gray), and regions of calcium are in white.

Screen capture of MMS reconstruction software user interface. In this illustration, blue segmentation A delineates thrombus, green segmentation B delineates contrast-enhanced bloodflow, segmentation C delineates calcium in the model.

Volume

%Volume Diff=$(V_{Modeler} - V_{Reviewer}) / V_{Reviewer}$

Deviation
---------

A = OUT_1 + OUT_2 + IN
% Deviation = (OUT_1 + OUT_2) / A

CASE 1: Both segmentations are EQUAL
OUT_1 + OUT_2 = 0
% Dev = 0

CASE 2: Both segmentations are DISJOINT
IN = 0
A = OUT_1 + OUT_2
% Dev = 1

Review (0): aaa.seg

Segmentation by sheldon, review by duxbury.

% Differnece    Slice 47    Tot (153/153)

| | | | | |
|---|---|---|---|---|
| bloodflow | 2.3 | 2.2 | 0.2 | 0.2 |
| thrombus+ncp | 0 | 0 | −0.6 | 0.7 |
| calcium | 0 | 0 | 0.0 | 0.0 |
| Other1 | 0 | 0 | −1.0 | 1.0 |
| Other2 | 0 | 0 | 0 | 0 |
| Other3 | 0 | 0 | 0 | 0 |
| Other4 | 0 | 0 | 0 | 0 |
| Other5 | 0 | 0 | 0 | 0 |
| Other6 | n | n | n | n |
| Other7 | 0 | 0 | 0 | 0 |
| All | 2.3 | 2.2 | −0.2 | 0.4 |

A   B   C   D   E

☐ Slice Reviewed        Add Slice Comment

Slice stepsize: next —

[Review Slice]  [Review All]  [Calc Total]

[Save]  [Report]  [Close]

USING STATISTICAL PROCESS CONTROL (SPC) TO DEMONSTRATE SOLUTION CONVERGENCE IN A TECHNICIAN GUIDED SEGMENTATION SYSTEM

REFERENCE TO PENDING PRIOR PATENT APPLICATIONS

This patent application is a continuation of pending prior U.S. patent application Ser. No. 10/892,754, filed Jul. 15, 2004 now U.S. Pat. No. 7,340,081 by David T. Chen et al. for STATISTICAL PROCESS CONTROL (SPC) TO DEMONSTRATE SOLUTION CONVERGENCE IN A TECHNICIAN GUIDED SEGMENTATION SYSTEM which in turn claims benefit of:

(1) prior U.S. Provisional patent application Ser. No. 60/487,884, filed Jul. 15, 2003 by David T. Chen et al. for USING STATISTICAL PROCESS CONTROL (SPC) TO DEMONSTRATE SOLUTION CONVERGENCE IN A TECHNICIAN GUIDED SEGMENTATION SYSTEM; and (2) prior U.S. Provisional patent application Ser. No. 60/580,082, filed Jun. 15, 2004 by David T. Chen et al. for USING STATISTICAL PROCESS CONTROL (SPC) TO DEMONSTRATE SOLUTION CONVERGENCE IN A TECHNICIAN GUIDED SEGMENTATION SYSTEM.

The above-identified patent applications are hereby incorporated herein by reference.

FIELD OF THE INVENTION

This invention relates to medical imaging in general, and more particularly to medical imaging comprising computer models generated from scan data.

BACKGROUND OF THE INVENTION

Source medical images, such as from Computerized Axial Tomography ("CT" or "CAT") or Magnetic Resonance Imaging ("MRI") scanners, comprise images in which interior anatomical structures can be identified. See, for example, FIG. 1, which shows a typical scan image of interior anatomical structures. In general, CT scanners work by passing X-rays systematically through the body, while MRI scanners rely on a radio-sensitive effect caused by aligning water molecules within the body.

In the case of vascular structures, the anatomical structure being visualized can include bloodflow lumen, thrombus, calcified plaque, and non-calcified plaque. Bloodflow refers to that part of the vessel anatomy in which blood is flowing freely. Thrombus is clotted blood that is very thick and viscous. Calcified plaque is a hard, bone-like substance that forms within blood vessels and is a significant contributor to vessel stenosis.

The aorta is the main artery that takes blood from the heart, through the abdomen and into the lower part of the body. An aneurysm refers to a disease state in which the blood vessel wall becomes weakened and then "balloons" out in a characteristic way. An abdominal aortic aneurysm ("AAA") refers to an abnormal, localized enlargement of the aorta in the region below the renal arteries (which feed the kidneys) and above the iliac bifurcation. See, for example, FIG. 2, which shows a typical abdominal aortic aneurysm. If left untreated, such an aneurysm will frequently continue to enlarge in size until it ultimately ruptures and causes death. The precise cause of AAA is unknown but is most commonly associated with atherosclerosis, hypertension and smoking.

The source medical images from CT or MRI scanners generally comprise a set of two-dimensional slices taken through the patient's body. Each slice comprises a two-dimensional matrix of intensity values (e.g., 0-4095) reflecting different tissue characteristics. These slices may be viewed in their native format (e.g., as an image created with different shades of darkness, according to the scan's intensity values). Alternatively, the intensity values within a particular slice may be analyzed and the boundaries and regions for each of the anatomical structures shown in that slice labeled or "segmented". The segmented two-dimensional slices may the be viewed as individual slices or they may be further processed; using volume rendering techniques so as to create 3-dimensional computer models of the patient's anatomy, or 3-dimensional meshes of the isosurfaces representing the segmented boundaries may be constructed, or metrics such as volume or surface area may be calculated.

In connection with the foregoing, a problem associated with the prior art is that, in order to be quantitatively accurate and meaningful, the segmentation process must currently be conducted for every single slice of the source medical images.

Medical Metrx Solutions (formerly Medical Media Systems) of West Lebanon, N.H. ("MMS") provides outsourced advanced imaging and three-dimensional reconstruction services. The processing services of MMS are a fundamentally different business model than conventional systems that offer workstation/software packages used for in-house three-dimensional modeling.

More particularly, conventional systems are generally based on either Maximum Intensity Projection ("MIPS") or other automated segmentation and volume-rendering techniques. These conventional segmentation technologies, which are designed for general diagnostic, gross visualization of data, have the advantages of automatic segmentation processing, however, they also have the severe disadvantages of limited accuracy. The technical limitations of automatic segmentation processing include a substantial number of artifacts (i.e., missing or misleading anatomical elements), poor imaging of thrombus and small vessels, and the inability to accurately quantify anatomic measurements such as volume.

Instead of the automatic segmentation software used by conventional systems such as GE Advantage Windows™, Vital Images Vitrea™ and others, the MMS system is based on technician-guided segmentation in which axial slice data is manually reviewed and edited by highly trained technicians. MMS has compared its hand segmentation process to competing systems and found that for certain applications, including AAA modeling, the MMS system of hand segmenting image data produces models of superior accuracy. Among other things, the MMS hand segmentation process permits the creation of highly accurate polygon-based surface representations which provide the basis for the advanced MMS treatment planning software, Preview®, which includes multiple model objects. See, for example, FIG. 3, which shows a screen capture from the MMS Preview® system. The semantic nature of the MMS Preview® model enables extensive measurements to be made of the anatomy, including volumes, areas, distances, and computer-generated centerlines. The MMS image processing system is designed to ensure the highest standard of product quality and includes built-in metrics and methods for measuring that quality.

The MMS reconstruction software is designed to optimize the accuracy of segmentation of multiple anatomical structures when used by highly trained technicians. Proprietary segmentation tools allow for precise definition of bloodflow, thrombus/non-calcified plaque, calcium and other objects simultaneously during technician-guided processing of the CT or MRI scan data.

While conventional systems geared to produce automatic diagnostic output may take on the order of 15-30 minutes of operator time to run, at MMS it can take several hours to manually define the segmentation on every image of a 200 slice study. The fundamental limiting factor is the requirement for the technician to look at, and manipulate (e.g., to segment the different anatomical structures by "painting" on the native slice image), each slice image individually. At MMS, a typical study normally involves the processing of approximately 180 slices. However, with newer technology now becoming available, such as multi-detector CT machines, the number of source images can increase dramatically, e.g., by a factor of ten. This can dramatically increase the workload placed on the trained operator when conducting hand segmentation of the scan slices.

Thus, there is needed a way to reduce the processing time associated with hand segmenting every slice of a study without sacrificing model integrity.

SUMMARY OF THE INVENTION

To mitigate the problem of "too many slices", a segmentation interpolation system has been developed by MMS which can automatically, and reliably, derive, using the native scan data, the segmentation for "in between" slices from any number of hand segmented key slices ("key frames"). Conceptually, segmentation interpolation can be considered to have some very rough analogies to a "key frame" three-dimensional animation system where it is too tedious for an animator to specify the exact location of all scene elements for every single frame. In this animation task, the computer can be used to interpolate the "key frames" to create any number of interpolated scenes.

For the purposes of segmentation interpolation, the important observation to make is that true anatomical differences can be represented on relatively few slices while the great majority of slices will be more alike than different. For example, at the aortic bifurcation, the configuration of the anatomy is changing rapidly so that many key frames may be needed to accurately represent this area. On the other hand, in the main body of the aneurysm, each slice looks very similar to its neighbors, so that less key frames may be needed to accurately represent the anatomy.

Thus, this new system now developed by MMS combines the best of two worlds: hand segmentation is used for the most critical slices (i.e., where the anatomy is changing rapidly from slice to slice) and automatic segmentation is used for the less-critical intervening slices (i.e., where the anatomy is relatively constant from slice to slice). Thus, with the new MMS system, the key frames are hand segmented and the intervening frames are automatically segmented using an interpolation technique. Furthermore, the MMS system provides algorithms for ensuring that an appropriate set of key frames (i.e., adequate in both number and location) is used so as to ensure an accurate representation of the anatomy involved.

BRIEF DESCRIPTION OF THE DRAWINGS

These and other objects and features of the present invention will be more fully disclosed or rendered obvious by the following detailed description of the invention, which is to be considered together with the accompanying drawings wherein:

FIGS. 9, 10 and 10a are screen displays illustrating how statistical process control ("SPC") may be used in connection with the present invention;

DETAILED DESCRIPTION OF THE INVENTION

Overview

With the new MMS system:

(1) the scan data is acquired from the patient;

(2) a plurality of key frames are selected from the scan data;

(3) the selected key frames are hand segmented by a technician, whereby to identify specific anatomical structures;

(4) an interpolation process is used to automatically generate segmented intervening frames for the regions between the key frames;

(5) the segmented intervening frames are merged with the segmented key frames so as to generate a complete set of segmented frames;

(6) a computer model of the patient's anatomy is generated from the complete set of segmented frames;

(7) a first measurement is made of a selected feature of the computer model;

(8) at least one additional key frame is hand segmented by a technician and used to replace a corresponding intervening frame within the complete set of segmented frames;

(9) the computer model is re-computed based upon the updated set of segmented frames;

(10) a second measurement is made of the selected feature of the re-computed computer model;

(11) the second measurement is compared with the first measurement; and

(12) if the second measurement differs from the first measurement by a statistically significant amount, the second measurement is used to replace the first measurement and the process is repeated from Step 8 on, otherwise the model is considered completed.

In one preferred form of the invention, the initial set of key frames may be automatically generated by the system, e.g., the system may automatically select some subset of the scans to be the key frames. Or the technician may select the key frames.

And in another form of the invention, the interpolation process may automatically generate segmented intervening frames for the regions between the key frames by interpolating solely from the segmented key frames. Or the interpolation process may automatically generate segmented intervening frames for the regions between the key frames by utilizing the native scan data in combination with the segmented key frames.

Interpolation Algorithms

Two potential algorithms available to accomplish segmentation interpolation are the "Snakes" (or "active contours"), and "Fast Marching" (or "level set") methods. Other interpolation algorithms exist as well. For the purposes of the present invention, the precise details of how the segmentation interpolation is actually implemented is not critical.

Figure 1:
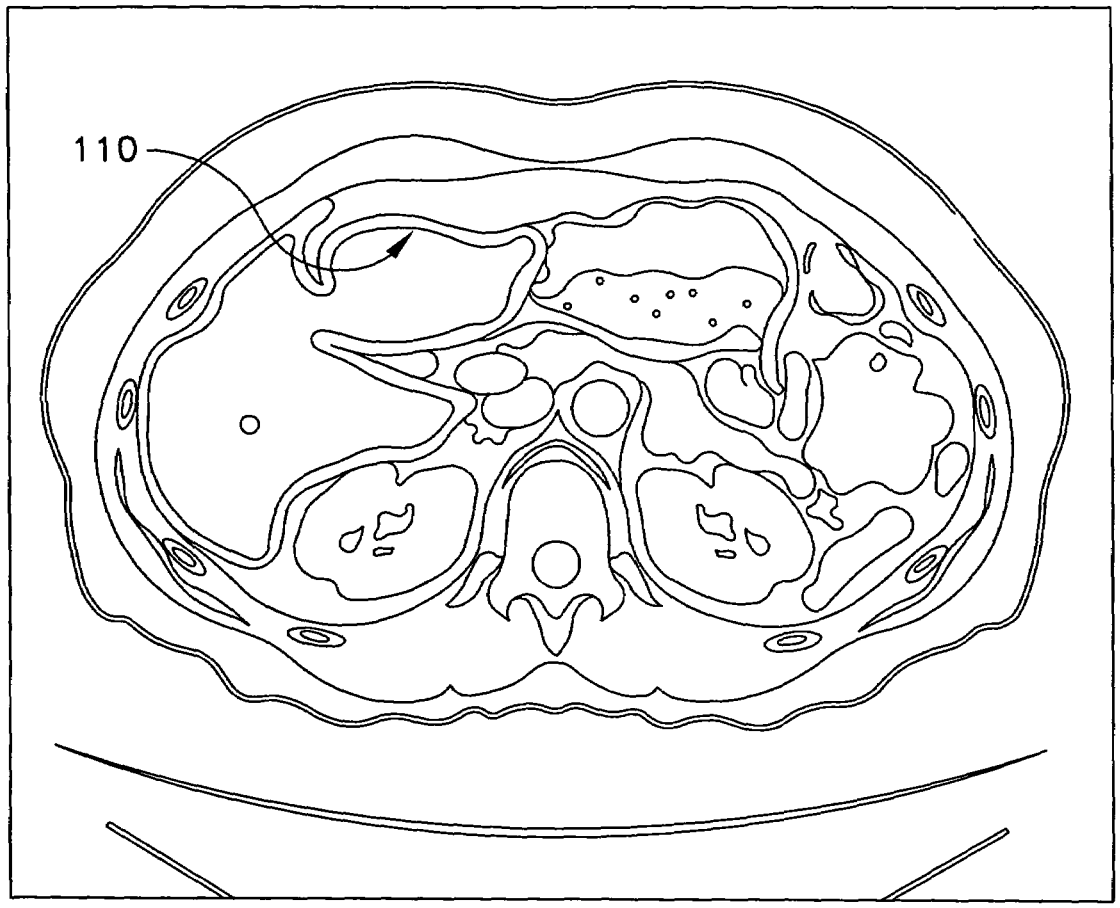
FIG. 1 is a schematic view of a typical scan image of interior anatomical structures.
Figure 2:
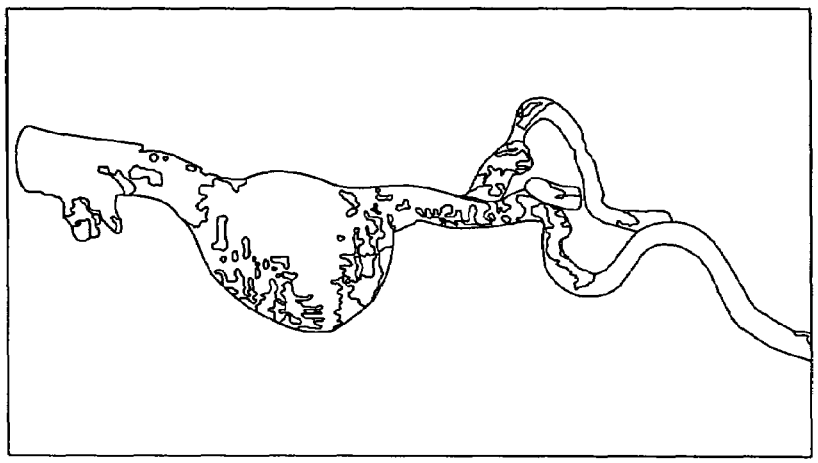
FIG. 2 is an MMS reconstruction of an actual abdominal aortic aneurysm (AAA)
Figure 3:
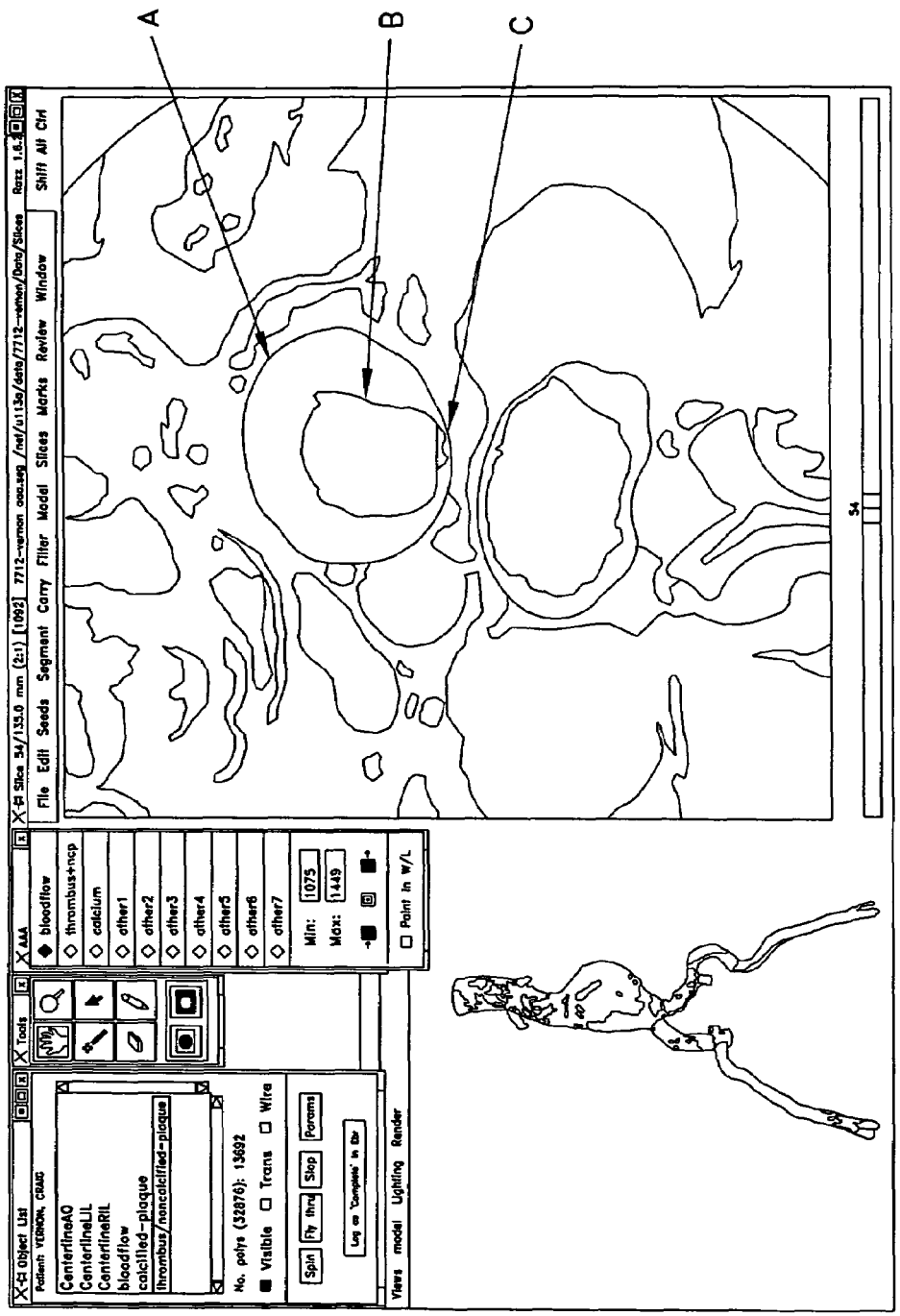
FIG. 3 is a screen capture of the MMS Preview® reconstruction software user interface.
Figure 4:
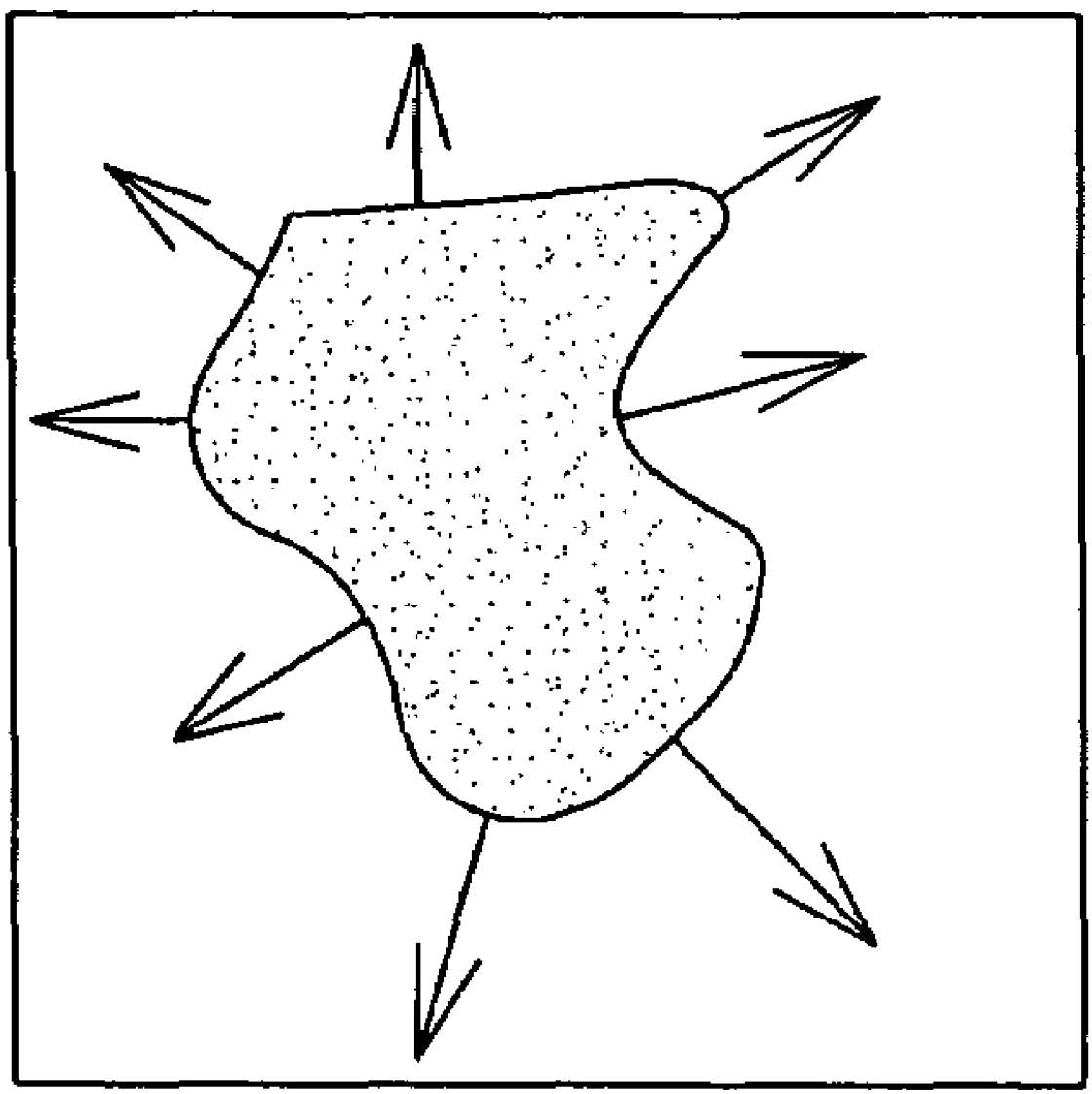
FIG. 4 is a schematic view illustrating a Snake-based algorithm for segmentation interpolation.

Snake-based numerical techniques rely on markers, which try to track the motion of the boundary (see FIG. 4) by breaking it up into "buoys" that are connected by "pieces of rope". The idea is to move each buoy under the speed F, and rely on the connecting ropes to keep things straight. The belief is that, to some extent, more buoys will make the interpolation more accurate.

Unfortunately, things tend to get quite complicated if the buoys "try to cross over themselves", or if the shape "tries to break into two"; in these cases, it is very hard to keep the connecting ropes organized. In three dimensions, following a surface like a breaking ocean wave, is particularly difficult.

Figure 5:
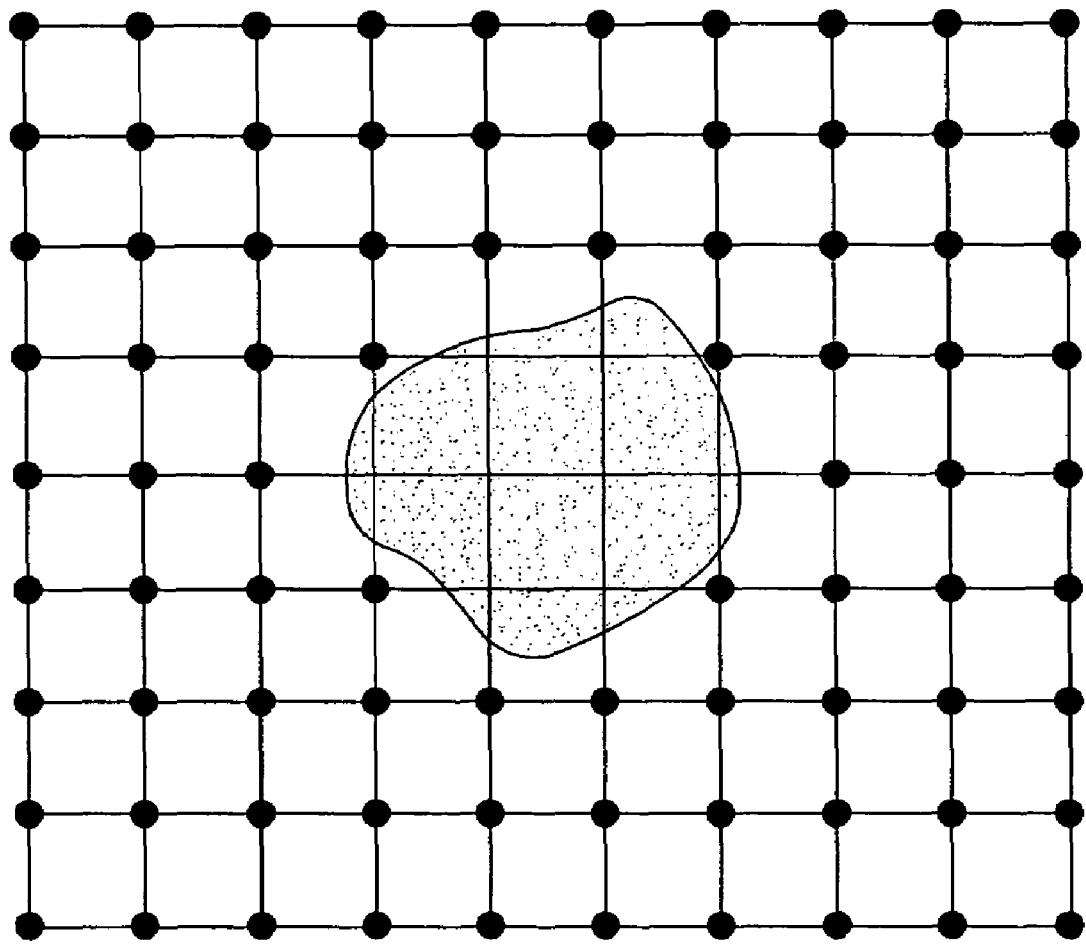
FIGS. 5 and 6 are schematic views illustrating a Fast Marching (level set) based algorithm for segmentation interpolation.

Rather than follow the boundary itself, the Fast Marching algorithm makes use of a stationary approach to the problem. At first glance, this sounds counter-intuitive; a moving boundary problem is being traded for one in which nothing moves at all. To see how this is done, imagine a grid laid down on top of the structure, as shown in FIG. 5. Now suppose that a person is standing at each red grid point with a watch. When the front crosses each grid point, the person standing there notes the crossing time T. This grid of crossing time values T(x,y) determines a function; at each grid point T, T(x,y) gives the time at which the front crosses the point (x,y).

Figure 6:
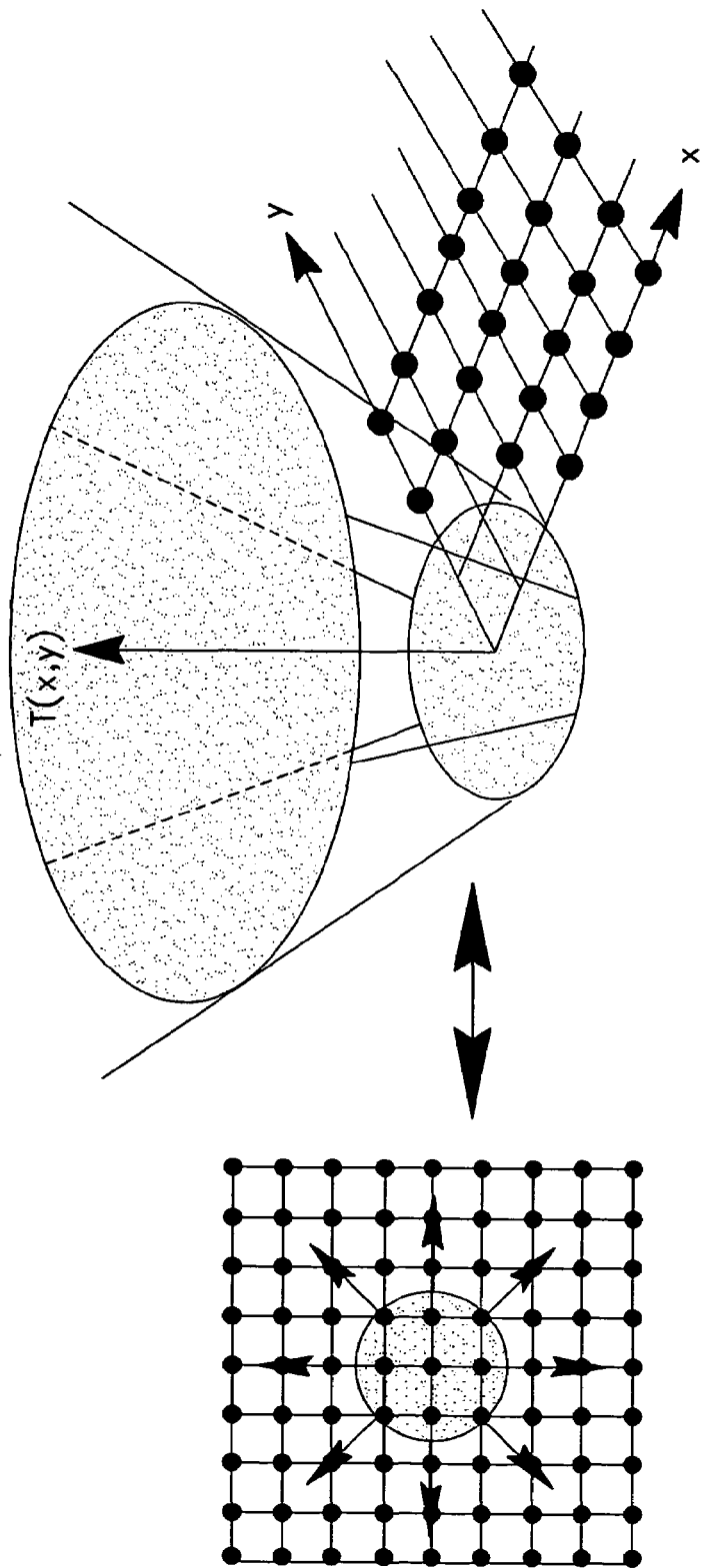

As an example, suppose the initial solution is a circle propagating outwards (see FIG. 6). The original region (the blue one on the left side of FIG. 6) propagates outwards, crossing over each of the timing spots. The function T(x,y) gives a cone-shaped surface, which is shown on the right side of FIG. 6. This surface has a significant property; it intersects the x-y plane exactly where the curve is initially. Better yet, at any height T, the surface gives the set of points reached at time T. The surface on the right side of FIG. 6 is called the "arrival time surface", because it gives the arrival time.

Statistical Process Control ("SPC")

So given some number of hand segmented images, and a method to perform segmentation interpolation, preferably using native scan data, a critical problem that this invention is designed to address is how to quantitatively develop a "stopping criterion" for developing a level of confidence in the number of key frame slices that are actually segmented by hand. It has been long accepted that technician-guided segmentation is the "gold standard" for anatomic veracity. The new MMS system is based on the concept that, by hand segmenting a statistically appropriate number of key frames, the "gold standard" can be effectively achieved without hand segmenting every slice in the study.

At MMS, it is believed that for a typical abdominal aortic aneurysm (AAA) study, only about 30 of 180 slices will need to be key framed, i.e., hand segmented. How can this number by proven?

Because we are creating a medical product that requires a detailed examination of slice data for anatomy, the MMS modeling staff must undergo an extensive training program. In addition, MMS has instituted a review system in which an anatomy expert verifies every study before the final product is released. The MMS product specification (as determined to provide sufficient clinical utility) is to make volume calculations to an accuracy of plus or minus 5%.

Figure 7:
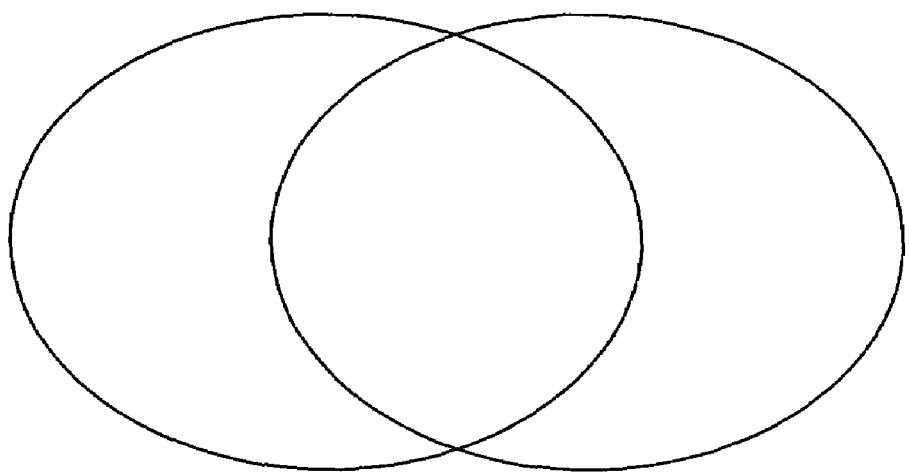
FIGS. 7 and 8 are schematic views illustrating measures that express how divergent two segmentations are from one another.
Figure 8:
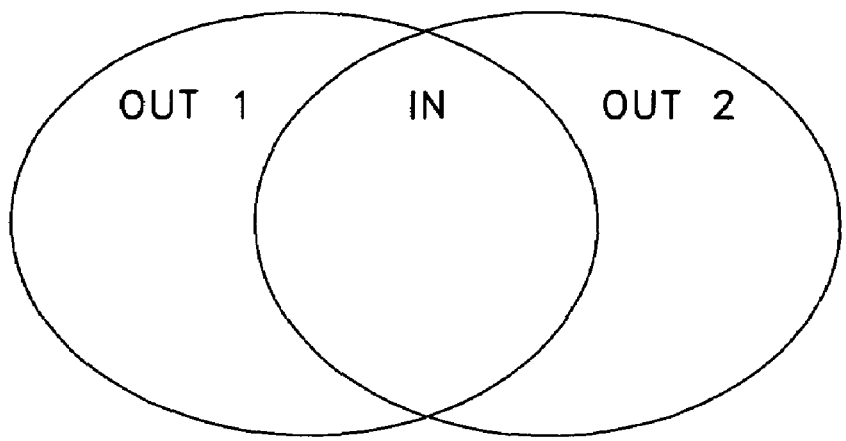

As part of the MMS model/review process, MMS employs Statistical Process Control ("SPC") to numerically quantify the quality of the segmentation that is created during the initial modeling stage. MMS has developed measures that express how divergent two segmentations are from each other. The simplest measure is percent (%) volume change for all the slices of a study. Based on the MMS product specification, the goal is for the initial segmentation to differ by no more than 5% from the segmentation as defined by the reviewer. A second measure that MMS has developed is percent (%) deviation, which provides a more stringent assessment that accounts for all differences between what a modeler has done and the subsequent review. The Venn diagrams shown in FIGS. 7 and 8 illustrate how the % Volume Difference and % Deviation are calculated.

FIG. 9 shows how these quantities are tabularized in the context of the current MMS segmentation tools. The first column (A) shows the segmentation elements that will be compared. The next two columns (B and C) show the SPC measures for the current slice. The first column in this group (B) is the % Volume difference for Slice 47, while the one to the right (C) is the % Deviation for Slice 47. The last two columns (D and E) present these same two SPC measures but cumulated through all 153 slices. The bottom "All" row is a cumulated sum of the results for each color.

A novel stopping criterion for the number of key frame slices that are used to drive any segmentation interpolation scheme has been developed as follows.

First, it should be recognized that as more and more key frame (i.e., hand segmented) slices are added, the divergence of an "interpolated" segmentation ($S_{INTERP}$) from the gold standard segmentation ($S_{GOLD}$) will, by definition, approach zero. That is, in the limit when every frame is a key frame, then $S_{INTERP}=S_{GOLD}$.

Figure 10:
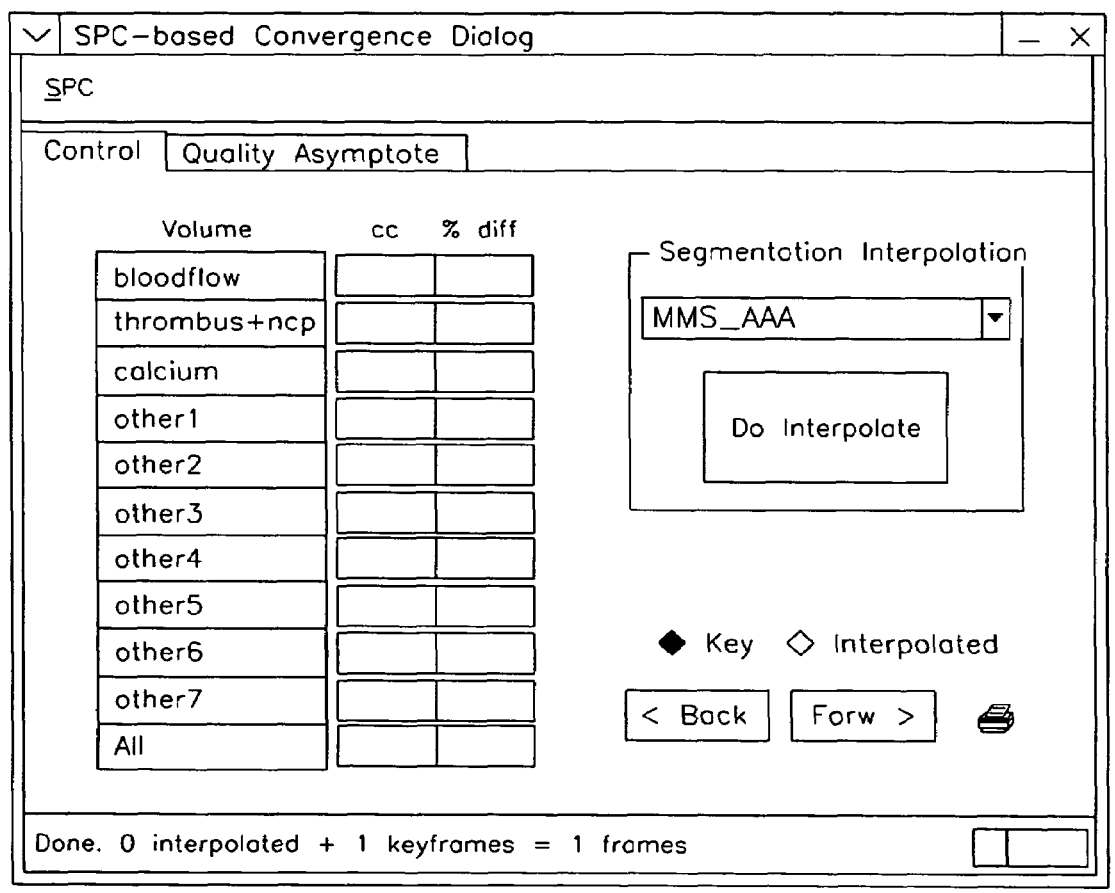

Consider the components of the graphical user interface shown in FIG. 10. As before, the two columns of data on the left of FIG. 10 represent, for each anatomic structure, the segmentation volume in cubic centimeters (cc) and the percent change in volume. In addition, the bottom label shows how many key frames were done for the last two $S_{INTERP}$ that have been created and the total number of frames that are compared. In the "Segmentation Interpolation" box, the "MMS_AAA" Combobox represents one choice of a multiplicity of interpolation algorithms to apply. The "Do Interpolate" button will cause a new $S_{INTERP}$ to be made with the new currently defined key frames. The cc and % diff columns will be automatically recalculated at this time.

Using the 5% volume difference from the MMS Preview® product specification, the claim can be made that if, with the addition of extra key frames, the % volume change is not greater than 5%, then the solution $S_{INTERP}$, as obtained through segmentation interpolation, is converging to the "gold standard" of manual segmentation of every slice. At MMS, this information is saved as part of the "Production Batch Record" as a means of verifying the level of quality that has been achieved for any given study (see the "Report" button in FIG. 9).

Figure 10A:
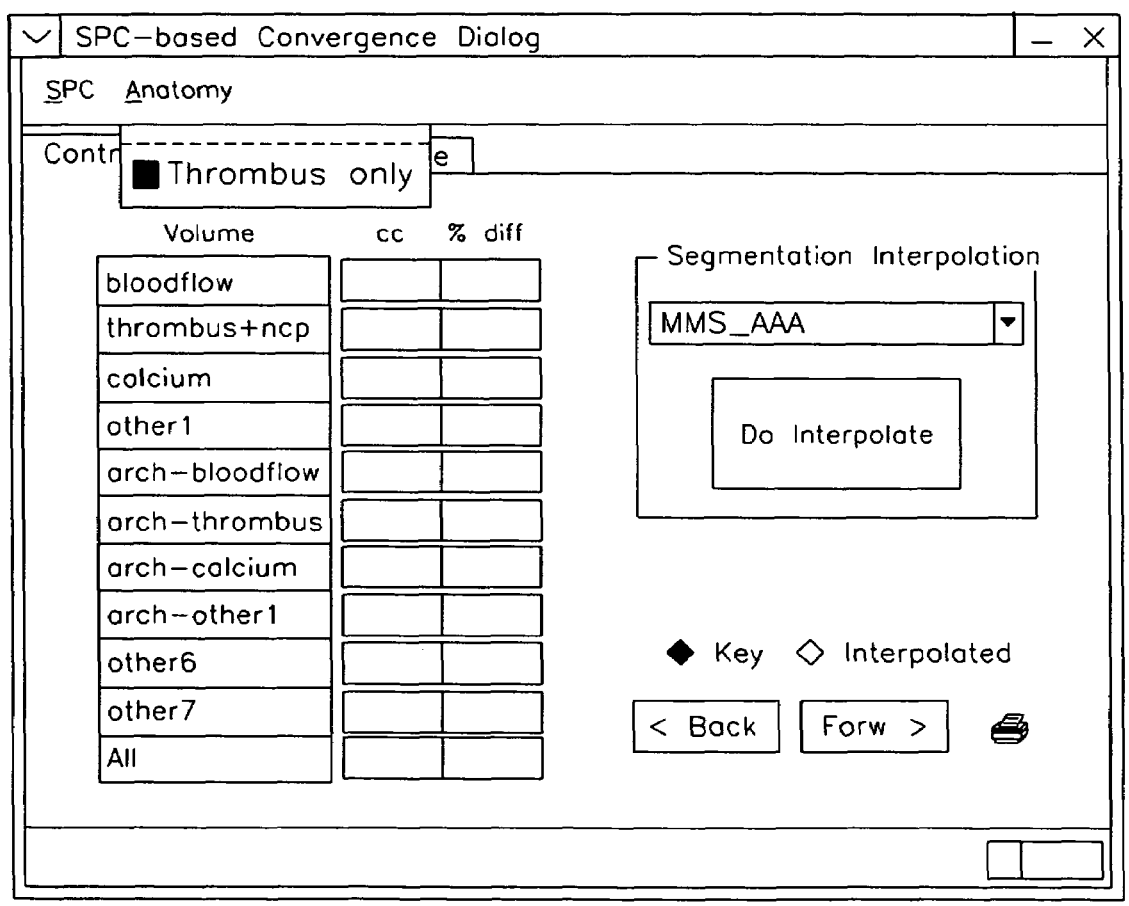

Furthermore, FIG. 10a shows a refinement of the process just described wherein the production technician can choose to perform the segmentation interpolation step based solely on a single anatomical element (in this case thrombus). Experience has shown that of the various anatomic elements identified for a AAA study that the bloodflow is relatively simple while the thrombus is quite difficult. For this reason, algorithms that segment bloodflow only have been successfully implemented at MMS. Thus in order to produce a complete segmentation product, the interpolator must be informed to ignore the bloodflow layer and operate solely on key frames as defined by thrombus.

Methods for Defining the Initial Key (or "Exemplar") Frames

In addition to the foregoing, the present invention includes the following preferred methods for defining the initial key (or "exemplar") frames.

1. A Method for Defining a Stepping Interval Between the Initial Key (or Exemplar) Frames.

Figure 11:
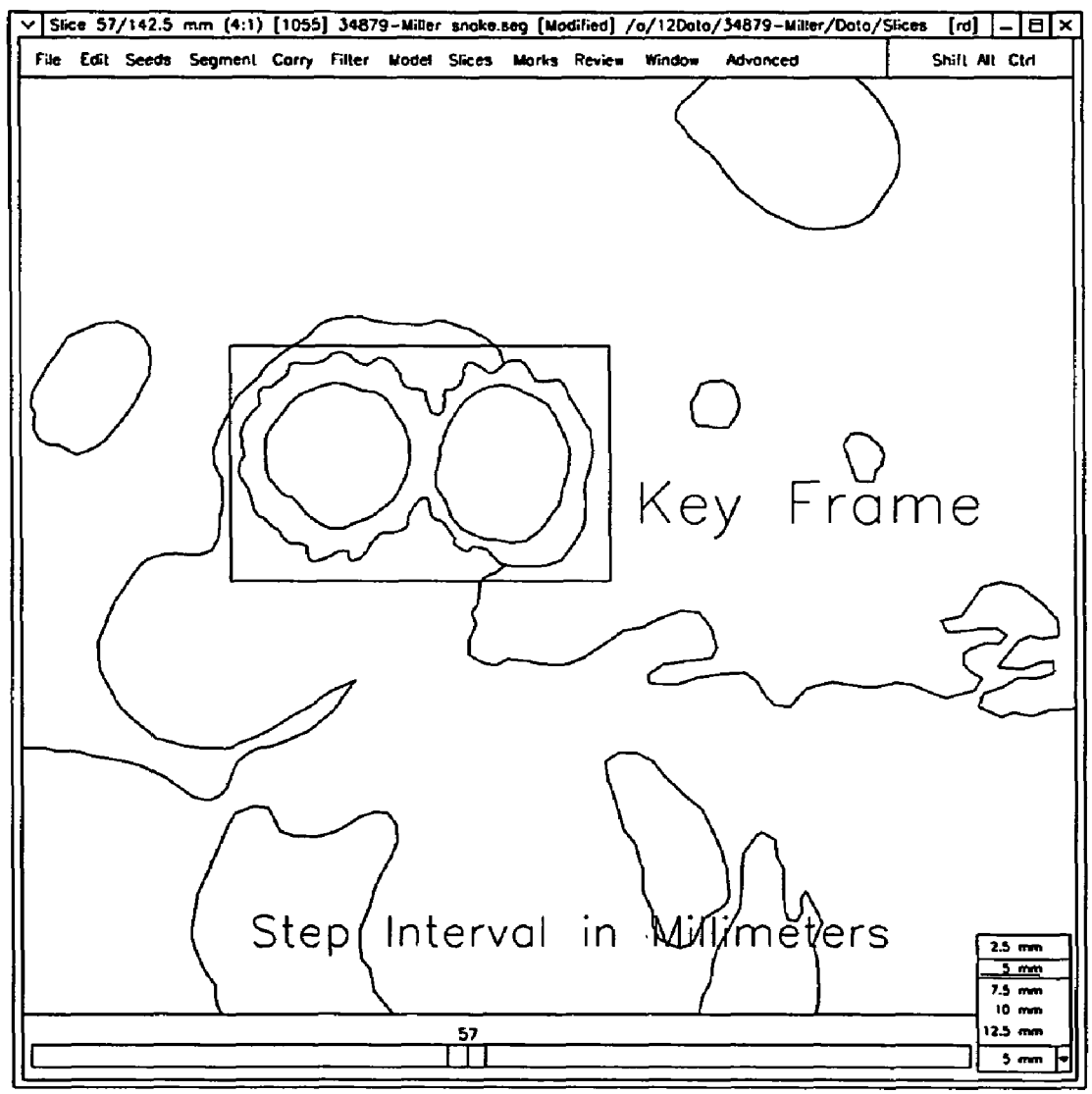
FIG. 11 illustrates a method for defining a stepping interval.

The step interval between the initial key frames can be either manually specified in millimeters or number of frames, or automatically specified through knowledge of the underlying anatomy or rate of change of the segmentation, etc. See FIG. 11.

Stepping intervals define the distance between two sequential key frames. A preferred method is provided to traverse key frames based on stepping intervals.

1.1 Specify Stepping Interval in Number of Frames.

Each frame has a frame index number so that a specific key frame can be accessed by using its frame index number. With a stepping interval specified as a number of frames, the frame index number of the next key frame in a non-decreasing order is equal to:

frame index number of current key frame+stepping interval in number of frames

When the command of "next slice" is executed (e.g., when the "Forward" button is pressed), the program can jump to the next key frame by omitting the next (stepping interval−1) frames.

1.2 Specify Stepping Interval in Millimeters.

Based on the spacing information, the stepping intervals in millimeters can be translated into stepping intervals in the number of frames in the following way:

stepping interval in numbers of frames=stepping interval in millimeters/slice_interval where slice_interval is the distance in millimeters between two sequential frames.

After that, the next key frame can be found by applying the same technique used in Section 1.1 above.

1.3 Specify Stepping Interval Automatically Based on the Knowledge of the Underlying Anatomy.

With the knowledge of anatomy, the change of the segmentation can be predicted. If big changes in segmentations within some regions are expected, the stepping interval will be decreased. If little variations are expected, the stepping intervals are increased. Therefore, modelers save time by hand segmenting less frames in low-variance regions, and achieve more precision by hand segmenting more frames in high-variance regions.

The changing rate of stepping interval is preferably derived from large-scaled statistical investigations of patient studies in the MMS patient database compared to determinations by experienced modelers. In the MMS system, for a AAA application, by tagging the following slices:

start of aorta proximal neck
start of aneurysm body
aortic bifurcation
right iliac bifurcation
left iliac bifurcation it is a simple matter to automatically change the stepping interval based on knowledge of the anatomy being examined. Experience at MMS has shown that in the aorta body, (10 mm) intervals yield acceptable results, while 3 mm steps work better in the iliac branches.

1.4 Specify Stepping Interval Automatically Based on the Rate of Change of the Segmentation.

When a modeler is segmenting key frames, an algorithm can be employed to modify stepping intervals based on the geometrical and morphological change of the segmentation as it is being done. The change of stepping intervals can be formalized as:

Stepping Interval=$f$(distance penalty)

where the distance penalty is used as a measure of how fast the segmentation changes from key frame to key frame. In other words, changes in the segmentation are quantified as the geometrical and morphological differences of sequential segmentations, and can be computed from the distance map of the preceding segmentation:

distance penalty$_N$=$g$(segmentation$_N$, distancemap$_{N\text{-}STEP\_INTERVAL}$), where N is the frame index number 2. A Method to Generate or Copy the Bloodflow Segmentation Results from One Key Frame to the Next Key Frame.

It is also possible to provide a method to generate or copy the bloodflow (or other anatomy) segmentation results from one key frame to the next key frame. This can be based on a pixel-wise threshold ("geodesic dilation" or "flood operation") or on edge detection (e.g. Watershed algorithm).

Segmentation on the current key frame provides pixel intensity and key geometrical and morphological information that can assist the segmentation of the next slice. If it is assumed that the variations are small enough between two sequential slices, all information from the current slice can be carried to the next key frame in order to segment the new anatomy.

First, the index for the next key frame is identified using the techniques outlined in Section 1 above. Then, the following methodologies may be used to compute the anatomical labels:

(i) Bloodflow segmentation is copied from the current key frame to the next key frame. Based on the distribution of the pixel intensities in the current key frame, determine the pixel intensity range (Min/Max) which belongs to the bloodflow region. A binary set intersection technique ("Label Painted") is then applied. The "Label Painted" technique excludes pixels whose intensities fall outside of the determined pixel intensity range. Using the surviving pixels in the next key frame as seed points, the next key frame is flood-filled to obtain a starting bloodflow segmentation.

(ii) A watershed-based algorithm is applied to segment the next key frame. The advantage of this approach is that it can prevent over-flooding situations which may happen with geodesic dilation as implemented via the "Label_Painted+Flood" operations. The watershed algorithm needs 3 input parameters: water level, level threshold, and seed position. The preferred methods to determine seed position and optimize the watershed parameters are as follows.

(ii.i) Determining the seed position. Bloodflow segmentation is first copied from the current key frame to the next key frame. Then, "Label Painted" is applied to the next key frame. The centroid of the remaining bloodflow segmentation is taken as the seed for the watershed algorithm.

(ii.ii) Optimizing watershed parameters. A high water level and a high level threshold are preferably used as the initial watershed parameters for the next key frame. The watershed algorithm is then applied to the next key frame. Using the calculated seed position from step (ii.i), a candidate bloodflow segmentation is picked out from the multiplicity of segmentations produced by the watershed algorithm. Next, a distance penalty for the obtained segmentation is computed as follows:

distance penalty$_N$=g (segmentation$_{N+STEPPING\_INTERVAL}$, distancemap$_N$)

where N=the frame index of the current key frame.

If the computed distance penalty is higher than a preset threshold, both the water level and level threshold parameters are decreased; then the watershed algorithm is applied again. These steps are repeated for several iterations until the generated segmentation satisfies the distance penalty threshold.

3. A Method to Define Thrombus, Calcium and Other Blood Vessel Contents.

It is also possible to provide a method to define thrombus, calcium and other blood vessel contents. One preferred method includes the technique of segmenting both thrombus and calcium at the same time.

Once the bloodflow segmentation is complete, novel tools may be used to define other anatomical elements. The MMS system not only allows for the precise manual definition of segmentation for additional anatomy, but also includes tools for using pixel intensity, tools for using edge detection, and tools for simultaneously defining multiple anatomies.

3.1 Tools Using Pixel Intensity.

The pixel intensity range for each anatomic element can be determined from a previous key frame or decided on a case-by-case basis by experienced modelers.

Using this concept, first the bloodflow segmentation is dilated (grown), then with the proper pixel intensity range set, the "Label Painted" technique is used to catch thrombus, calcium, and the other vascular anatomy. A complete segmentation can be obtained by flooding each anatomical element separately. This can be an effective methodology if used in conjunction with a leak-detection algorithm to prevent massive over-segmenting in low contrast images or in areas which are difficult to discern.

3.2 Tools Using Edge Detection.

A "gradient magnitude" filter may be applied to the intensity image to get an image composed of edge information. Such gradient magnitude filters are well known in the computer imaging arts. With the edge image, there are then at least two ways to define other segmentation anatomies:

3.2.1 Dilating (Growing) the Bloodflow Segmentation Until it is Restrained by the Neighboring Edge Boundary.

With this technique, the bloodflow segmentation is dilated (grown) until it is restrained by the neighboring edge boundary. A contour restraint is adopted to prevent leaking. In each cycle of growing, the bloodflow segmentation cannot grow into "strong edges". "Strong edges" can be defined as those whose pixel values are higher than a pre-determined threshold in the edge image. If pixels do grow into strong edges, they are removed from the obtained segmentation. The dilation of segmentation stops when its "contour penalty" is higher than a threshold. The contour penalty is used as a measure of the smoothness of the outer boundary of the segmentation:

contour penalty=$f$(segmentation)

The more spatial high frequency areas (spikes) that there are along the segmentation boundary, the higher the contour penalty.

3.2.2 Using Bloodflow Segmentation as Seeds and Applying the Fast Marching (Level Set) Algorithm to Define Thrombus.

Figure 12:
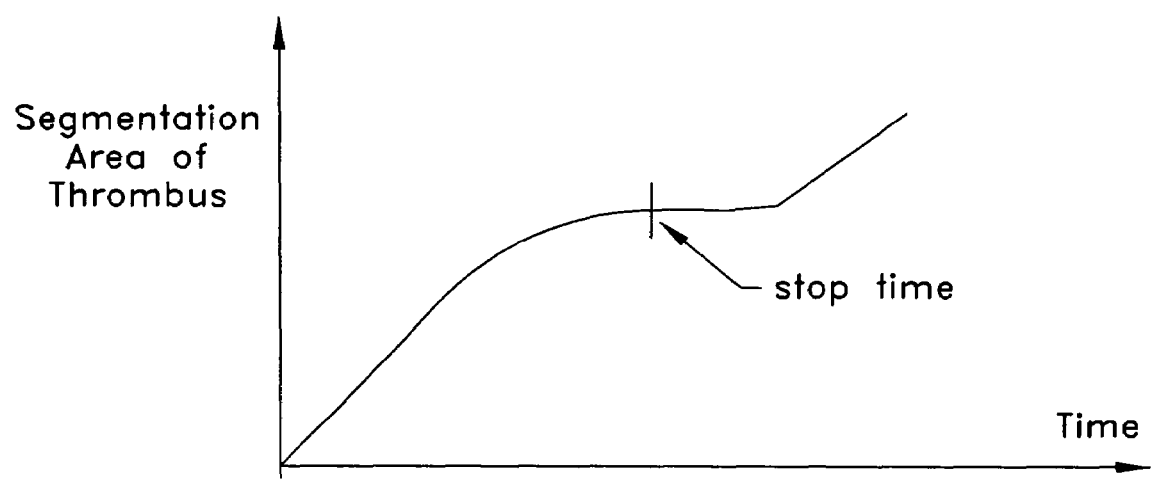
FIG. 12 illustrates how bloodflow segmentation may be used as a seed and a "Fast Marching" ("level set") algorithm may be used to define thrombus.

With this technique, bloodflow segmentation is used as seeds and the Fast Marching (level set) algorithm is applied to define thrombus. The parameter governing the Fast Marching algorithm is "stopping time". At each time interval, the area of the segmentation generated from the Fast Marching algorithm is computed. The stopping time is reached when the total area changed is below a threshold. See FIG. 12.

3.3 Tools to Simultaneously Define Multiple Anatomies.

Since the different anatomies to be segmented usually share boundaries and borders, it is a useful optimization to allow the segmentation system to define multiple anatomical types at the same time.

Figure 13:
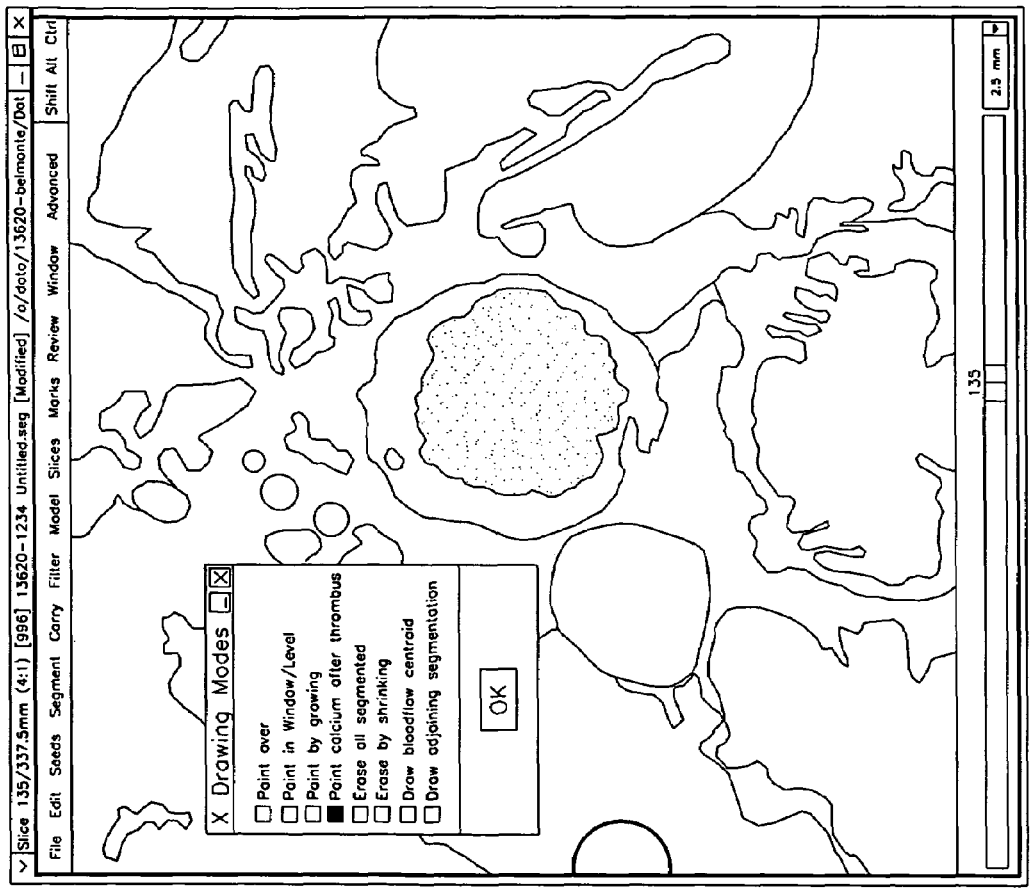
FIG. 13 is a series of screen displays illustrating how the MMS system provides tools to simultaneously define multiple anatomies.
Figure 13:
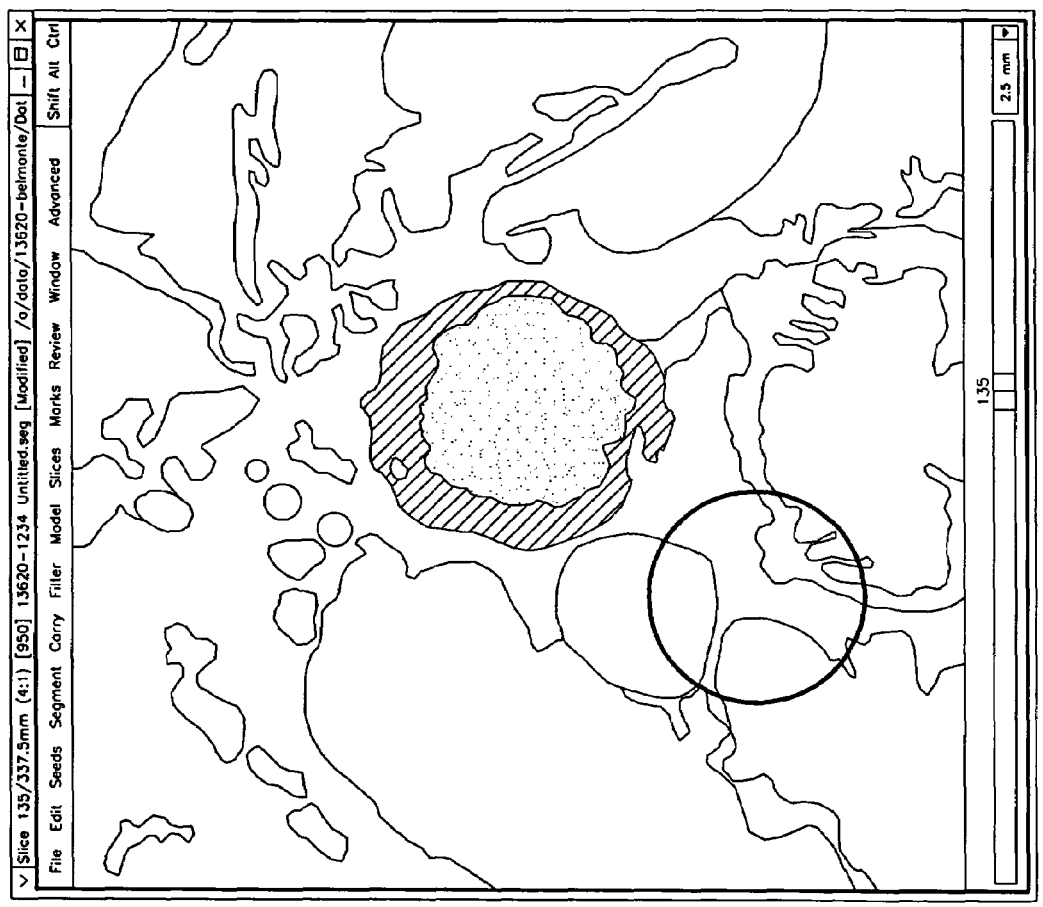
Figure 13:
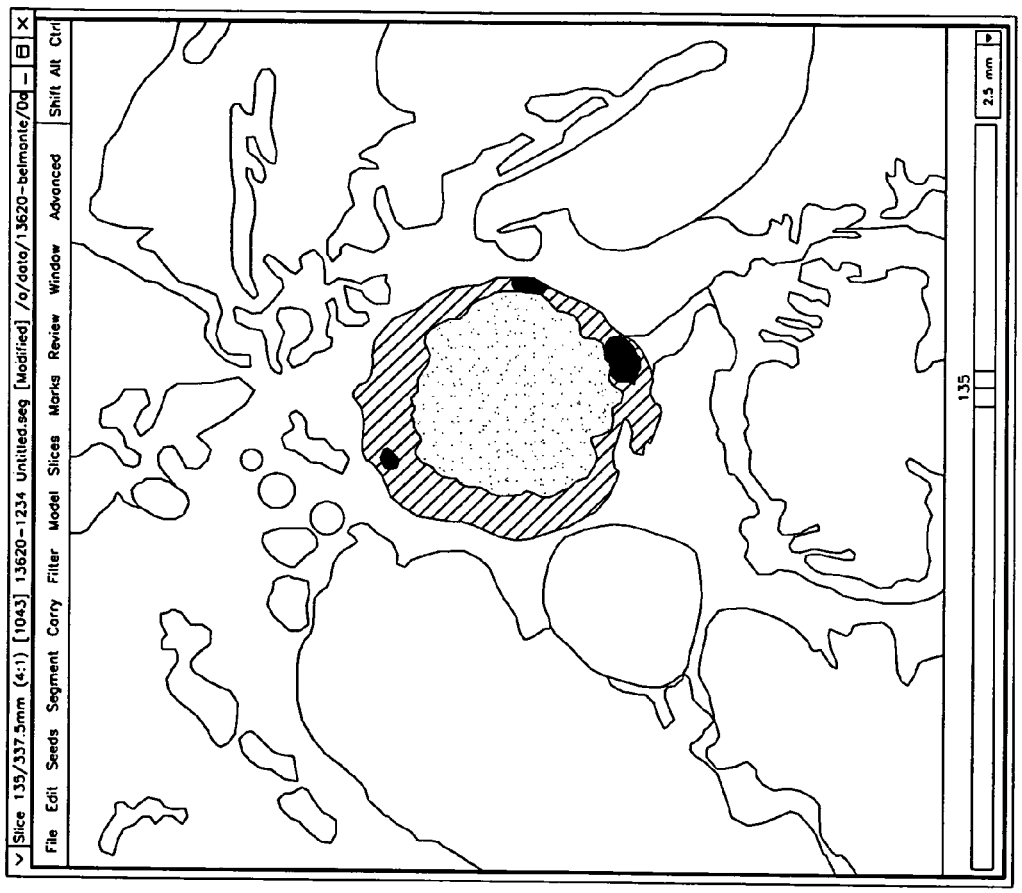

See FIG. 13.

The picture on the left side of FIG. 13 shows a completed bloodflow (blue) segmentation and the user interface to draw thrombus (green) and calcium (pink) at the same time—"Paint calcium after thrombus". In the middle picture of FIG. 13, the MMS technician has manually specified the boundary for the inner wall of the blood vessel. While drawing, the paint is displayed in the green thrombus color. When the user releases the mouse button, the calcium (pink) is automatically distinguished based on the pixel intensities of the underlying CT image (see the picture on the right side of FIG. 13). The MMS standard is that any pixel greater than 1450 Hounsfeld units should be labeled as calcium.

MODIFICATIONS

It will be appreciated that various modifications will be apparent to those skilled in the art in view of the present disclosure. These modifications are considered to be within the scope of the present invention.

What is claimed is:

1. A method for generating a computer model from scan data from a patient and measuring a selected feature of the computer model, the method comprising:
   (1) acquiring the scan data from the patient, wherein the scan data is acquired as a series of successive frames;
   (2) selecting a plurality of key frames from the scan data frames;
   (3) hand segmenting the selected key frames, whereby to identify specific anatomical structures;
   (4) automatically generating segmented intervening frames for the frames between the key frames using an interpolation process;
   (5) merging the automatically segmented intervening frames with the hand segmented key frames so as to generate a complete set of segmented frames;
   (6) generating a computer model of the patient's anatomy from the complete set of segmented frames; and
   (7) measuring a selected feature of the computer model.

2. A method according to claim 1 wherein the measuring of a selected feature of the computer model involves the measurement of volume.

3. A method for generating volume from scan data from a patient, comprising:
(1) acquiring the scan data from the patient, wherein the scan data is acquired as a series of successive frames;
(2) selecting a plurality of key frames from the scan data frames;
(3) hand segmenting the selected key frames, whereby to identify specific anatomical structures;
(4) automatically generating segmented intervening frames for the frames between the key frames using an interpolation process;
(5) merging the automatically segmented intervening frames with the hand segmented key frames so as to generate a complete set of segmented frames; and
(6) generating volume of the patient's anatomy from the complete set of segmented frames.

4. A system for generating a computer model from scan data from a patient and measuring a selected feature of the computer model, the system comprising:
(1) apparatus for acquiring the scan data from the patient, wherein the scan data is acquired as a series of successive frames;
(2) apparatus for selecting a plurality of key frames from the scan data frames;
(3) apparatus for hand segmenting the selected key frames, whereby to identify specific anatomical structures;
(4) apparatus for automatically generating segmented intervening frames for the frames between the key frames using an interpolation process;
(5) apparatus for merging the automatically segmented intervening frames with the hand segmented key frames so as to generate a complete set of segmented frames;
(6) apparatus for generating a computer model of the patient's anatomy from the complete set of segmented frames; and
(7) apparatus for measuring a selected feature of the computer model.

5. A system according to claim 4 wherein the measuring of a selected feature of the computer model involves the measurement of volume.

* * * * *